United States Patent
Yang (10) Patent No.: US 7,336,412 B2
(45) Date of Patent: Feb. 26, 2008

(54) PZT UNIMORPH BASED, HIGH STROKE MEMS DEFORMABLE MIRROR WITH CONTINUOUS MEMBRANE AND METHOD OF MAKING THE SAME

(75) Inventor: Eui Hyeok Yang, Stevenson Ranch, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/474,978

(22) PCT Filed: Jun. 12, 2002

(86) PCT No.: PCT/US02/18400

§ 371 (c)(1),
(2), (4) Date: Mar. 26, 2004

(87) PCT Pub. No.: WO02/101442

PCT Pub. Date: Dec. 19, 2002

(65) Prior Publication Data

US 2004/0150871 A1  Aug. 5, 2004

Related U.S. Application Data

(60) Provisional application No. 60/298,000, filed on Jun. 12, 2001.

(51) Int. Cl.
*G02B 26/00* (2006.01)

(52) U.S. Cl. ............... 359/291; 359/290; 359/224

(58) Field of Classification Search ............ 359/290, 359/291, 293, 230, 323, 849, 846, 295, 294, 359/292, 224, 549
See application file for complete search history.

(56) References Cited

U.S. PATENT DOCUMENTS

| 5,171,484 A | 12/1992 | Nishimura et al. |
| 6,108,121 A * | 8/2000 | Mansell et al. ............ 359/291 |
| 6,123,985 A * | 9/2000 | Robinson et al. .......... 427/162 |
| 6,630,894 B1 * | 10/2003 | Boyd et al. ................. 341/22 |
| 2004/0017623 A1 * | 1/2004 | Watson ...................... 359/849 |

* cited by examiner

*Primary Examiner*—Ricky Mack
*Assistant Examiner*—Brandi Thomas
(74) *Attorney, Agent, or Firm*—Myers Dawes Andras & Sherman LLP (57) ABSTRACT

A PZT unimorph actuated, continuous transferred membrane comprises a controllably deformable mirror. The actuators with a 12 μm stroke at 20V are fabricated as an array, which is designed to meet the unique needs of adaptive optics systems for vision science. What is provided is a deformable mirror with capabilities such as a robust construction, low power, compact size and low weight. The actuation principle for deforming a mirror element is based on the piezoelectric unimorph. A voltage applied to the piezoelectric layer induces stress in the longitudinal direction causing the piezoelectric unimorph to deform and push on the portion of the mirror connected to it. The advantage of this approach lies in the fact that generally small strains obtainable from the piezoelectric material at modest voltages are thus translated into large displacements.

15 Claims, 5 Drawing Sheets

PZT UNIMORPH BASED, HIGH STROKE MEMS DEFORMABLE MIRROR WITH CONTINUOUS MEMBRANE AND METHOD OF MAKING THE SAME

RELATED APPLICATIONS

The present application is related to U.S. Provisional Patent Application Ser. No. 60/298,000, filed on Jun. 12, 2001, to which priority is claimed pursuant to 35 USC 119 and which is incorporated herein by reference.

BACKGROUND OF THE INVENTION

1. Field of the Invention

The invention relates to the field of Micro Opto Electro Mechanical Systems (MOEMS) devices and in general to commercial micro systems technologies (MST) for optical communication.

2. Description of the Prior Art

Adaptive optics is a method for removing the blurring of images caused by changing distortions within optical systems. Turbulence in the Earth's atmosphere causes blurring of astronomical images. In an analogous manner internal imperfections and fluids in the eye cause blurring of images striking the retina.

Adaptive optics is a method for removing the blurring of images caused by changing distortions within optical systems. Turbulence in the Earth's atmosphere causes blurring of astronomical images. In an analogous manner internal imperfections and fluids in the eye cause blurting of images striking the retina. The use of adaptive optics allows ground based telescopes to see as clearly as if they were in space, and these techniques, when used to look at the retina of the human eye, dramatically sharpen images of the retina. Although adaptive optics was suggested for astronomy in the 1950s, only today are the requisite technologies (optics, computers, lasers) mature enough for adaptive optics to make an important impact on astronomy and vision science. Adaptive optics for astronomy on large telescopes promises a spectacular improvement in resolution, by factors of 10 to 30. Large ground-based telescopes using adaptive optics can even exceed the performance of the Hubble Space Telescope and at much lower cost. Adaptive optics for vision science promises to correct the aberrations of the eye and to provide a powerful tool for understanding the structure and development of cones and rods in the living human retina. It also holds the promise of diagnosing tiny retinal defects before they become large enough to threaten our person's vision. Adaptive optics systems require the marriage of several very advanced technologies—precision optics, wavefront sensors, deformable mirrors, and lasers-all tied together by high-speed control systems. In order for an optical system to approach its diffraction limit, it is necessary to correct the wavefront of the light to remove distortions that deviate the system from the ideal. Incorporating a deformable mirror can do this: i.e. a reflecting element that has on its backside an array of actuators that push and pull at the mirror to compensate for wavefront distortions. In a space based system, where energy and size considerations are paramount, it is highly advantageous to make this system small, compact, robust and energy efficient. Piezoelectrically actuated MEMS are needed from the point at which the benefit of precision spatial control offsets the added complexity of microfabrication. Lightweight, low power implementation of microfluldic pumps and micropositioners based on piezoelectric actuation can be incorporated into chromatographic/interferometric instruments and miniature propulsion systems. Recent studies indicate promising piezoelectric properties of some new thin film material compositions at ambient temperatures. Also piezoelectrically actuated deformable mirror arrays are rapidly becoming the next largest commercial MEMS applications, finding widespread use in telecommunication fiber-optic routers and advanced projection displays. Pixelated PZT actuated mirror arrays have been developed in the commercial arena.

MEMS technology is used to make ultra miniaturized and high-precision components for the micro optical subsystems for both conventional and cryogenic applications. Currently available continuous membrane deformable mirrors are not capable of generating 12 µm stroke actuation, while providing an excellent optical figure with modest actuation voltages.

Most currently available deformable mirrors are made with lead zirconium titanate (PZT), which degrades in optical quality over time, bringing hysteresis, creep, and capacitive heating effects, which are not satisfactory to meet NGST requirements for an optical figure which remains stable for a period of weeks. The electrostrictive lead magnesium niobate (PMN) technology at Xinetics Inc. has been demonstrated with excellent surface stability for a period of weeks (±2 µm stroke with 7 mm actuator spacing). Micromachined designs have been developed by several research groups to improve the deformable mirror technology and offer the potential to be scalable and cost effective. Segmented mirrors have been created with individual pixel tip/tilt capability. Micromachined continuous membrane deformable mirrors have been previously fabricated by Delfi and JPL. Both have excellent surfaces but the mirror membranes have high cross-talk between individual pixels. An electrostatically actuated, surface micromachined deformable mirror has been demonstrated. This micromachined deformable mirror has a continuous mirror backed by parallel plate actuators, which is fabricated using the surface micromachining technology embodied in the MUMPS. Restriction to the MUMPS creates design limitations and marginal surface quality, which in turn limits the applicability of this approach. A more recent effort has produced a continuous single crystal silicon deformable mirror, which is also electrostatically actuated.

None of the continuous membrane deformable mirrors described above, however, are capable of generating 12 µm stroke actuation with modest actuation voltages.

However, what is needed is a new design for the materials, structures and fabrication method is necessary to meet the requirements of imaging adaptive optics for the vision science.

BRIEF SUMMARY OF THE INVENTION

A mirror device is comprised of a transferred continuous membrane mirror supported by unimorph actuators. This structure makes it possible to pursue both the low inter-actuator coupling and optical quality mirror surface schemes. In order to realize this concept, a sheet of membrane (with surface area of 12 mm$^2$) is transferred onto the PZT unimorph actuators. The transfer of the membrane may be realized by any method now known or later devised, and in particular contemplates the methodology disclosed in copending PCT patent application by Yang and Wiberg, entitled, "Wafer-Level Transfer of Membranes in Semiconductor Processing," serial no. PCT/US01/46847, filed on Nov. 2, 2001, which is incorporated herein by reference. The mirror element actuation is based on piezoelectric unimorph.

A voltage applied to the piezoelectric layer induces stress in the longitudinal direction causing the film to deform and pull on the mirror connected to it. The continuous deformable mirror is actuated by PZT unimorph actuators with a 12 μm stroke generated with an applied voltage of ±9V.

The voltage applied to the piezoelectric layer induces stress in the longitudinal direction causing the film to deform and pull on the mirror connected to it. The advantage of this approach is that the small strains obtainable from a piezoelectric material at modest voltages are thus translated into large displacements.

Each segment would be an array of actuators designed to meet the requirements of adaptive optics systems for the vision sciences, high stroke deformable mirror with state of the art capabilities that are robust, low power, compact and low weight.

The invention thus can find an application in vision sciences where imperfections and fluids in the eye cause blurring of images striking the retina. In addition, piezoelectrically actuated deformable mirror arrays find widespread use in telecommunication fiber-optic routers and advanced projection displays.

Thus, the invention can be defined as a microcontrollable, deformable mirror comprising a mirror membrane, and a plurality of controllable piezoelectric microactuators forming an array. Each of the microactuators is coupled to the mirror membrane and is separately controllable to selectively deform at least a portion of the mirror membrane.

In the illustrated embodiment each piezoelectric microactuator comprises a PZT microactuator or more generally a unimorph. The actuator is characterized as having a maximum stroke of at least 12 μm and requires a drive of not more than approximately 20 volts. The mirror membrane provides a 100% fill factor, is continuous and is connected at a plurality of discrete points to the plurality of separately controllable piezoelectric microactuators.

In the illustrated embodiment each piezoelectric microactuator comprises a pedestal, a planar two dimensional unimorph and a supporting substrate. The unimorph is mounted on the supporting substrate and has a unstressed plane and electrodes defined on opposing surfaces so that in-plane stresses electrically induced in the planar two dimensional unimorph cause the unimorph to bend out of the unstressed plane in a selected direction. The pedestal is connected to the mirror membrane to couple deformation of the planar two dimensional unimorph into local deformation of the mirror membrane in the neighborhood of the connection to the pedestal relative to the supporting substrate. The deformation of the unimorph membrane is substantially independent at each of the discrete connection points.

The invention is also characterized as a method of fabricating a microcontrollable, deformable mirror comprising the steps of providing an optically polished carrier; depositing mirror material on the carrier to form a transfer mirror membrane; selectively deposing interface material on the mirror membrane; deposing a thick film of piezoelectric material on a substrate to form a unimorph layer; selectively micromaching the substrate to form a supporting substrate structure: selectively deposing interface material on the unimorph layer; bonding the unimorph layer to the mirror membrane by means of the interface material; and removing the carrier.

The step of deposing a thick film of piezoelectric material on a substrate to form a unimorph layer comprises the steps of forming the unimorph layer by spin coating a precursor sol-gel solution onto the substrate, pyrolyzing the spin-coated film and annealing the film. The method further comprises the step of multilayering the unimorph layer to form a thick film. The method further comprises the step of removing edge beads from the unimorph layer prior to the step of multilayering.

The invention is still further defined as a method of deforming a continuous mirror comprising the steps of providing a continuous, flexible mirror membrane; connecting a plurality of controllable piezoelectric microactuators to the mirror membrane at a plurality of discrete connection points, the plurality of controllable piezoelectric microactuators being arranged and configured into an array; and separately controlling each of the piezoelectric microactuators in the array to selectively deform the continuous mirror membrane.

The step of separately controlling each of the piezoelectric microactuators in the array comprises the step of generating a displacement of each actuator up to a maximum of 12 μm or more, and/or driving the actuator requiring with not more than approximately 20 volts.

The step of separately controlling each of the piezoelectric microactuators in the array to selectively deform the continuous mirror membrane comprises the step of deforming the mirror membrane at each of the discrete connection points in a substantially independent manner.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2 is a scanning electron microscopic photograph of the bottom surface of the actuators of FIGS. 1 and 1a.

FIGS. 3a-3j are diagrammatic side cross-sectional view of the intermediate structures realized during the fabrication of the microcontrollable, deformable mirror shown in FIGS. 1 and 1a.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

One aspect of the invention is a high stroke, continuous, optical quality mirror membrane 12, which will be fabricated by a membrane transfer technology described below in connection with FIGS. 3a-3j. Previously developed MEMS deformable mirrors do not satisfy the stroke requirement of the adaptive optics systems for the vision science (12 µm stroke with high fill factor). The invention will provide a deformable mirror with an actuator stroke of 12 µm at 20V actuation voltages. In addition, the proposed deformable mirror will provide an optical quality of a continuous mirror membrane (100% fill factor), while maintaining a 10% influence function, which is defined as inter-actuator coupling.

The piezoelectric unimorph technology combined with the membrane transfer technology is an excellent candidate for satisfying these necessary requirements. Piezoelectric technology is known to be the technology of choice in ultra-precise positioning equipments. Since actuators 14 are essentially capacitors, actuator 14 only consumes power when the position setting is altered. While a setting is maintained, only the support electronics consumes power. The unimorph arrangement of actuator 14 allows the typical small displacements achievable with conventional piezoelectric actuators 14 to be mechanically amplified to achieve a high stroke with a low actuation voltage. This is where the technology of the invention far outstrips the conventional piezoelectric arrays.

Thus. It can now be understood that in one sense the invention is a PZT unimorph actuated, continuous membrane deformable mirror with 12 µm stroke at 20V. The invention thus contemplates an array of unimorph actuators 14 designed to meet the unique needs of adaptive optics systems for vision science, requiring a deformable mirror with capabilities such a robust construction, low power, compact size and low weight. The actuation principle for deforming a mirror element is based on a piezoelectric unimorph. A voltage applied to the piezoelectric layer induces stress in the longitudinal direction causing the piezoelectric unimorph to deform and push on the mirror connected to it. The advantage on this approach lies in the fact that generally small strains obtainable from the piezoelectric material at modest voltages are thus translated into large displacements required for the mission. A simplified analytical treatment that follows proves that the concept does indeed achieve the required specifications.

Figure 1:
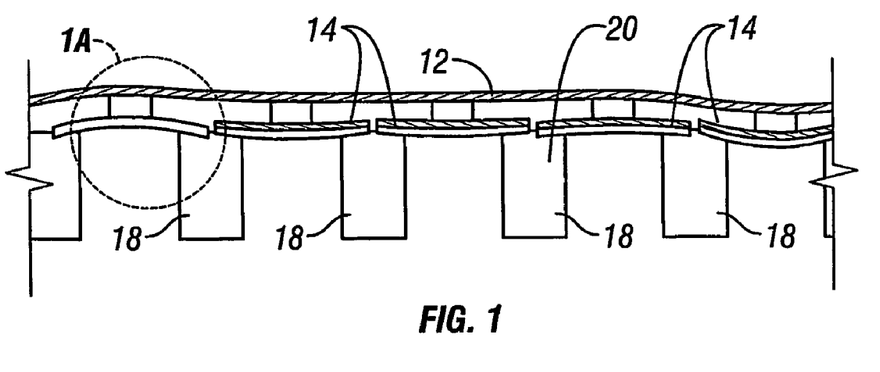
FIG. 1 is a simplified side cross-sectional view of the microcontrollable, deformable mirror of the invention.

FIG. 1 is a simplified side sectional view in enlarged scale of a deformable mirror 10 devised according to the invention. Deformable mirror 10 is comprised of a transferred continuous membrane mirror 12 in the form of a continuous sheet supported by a plurality of individually controllable microactuators 14 as shown in FIG. 1. This actuator geometry makes it possible to have low inter-actuator coupling and a quality mirror surface for mirror 12. The approach also has the flexibility of allowing different actuation mechanisms to be incorporated with the membrane transfer technology.

Figure 1A:
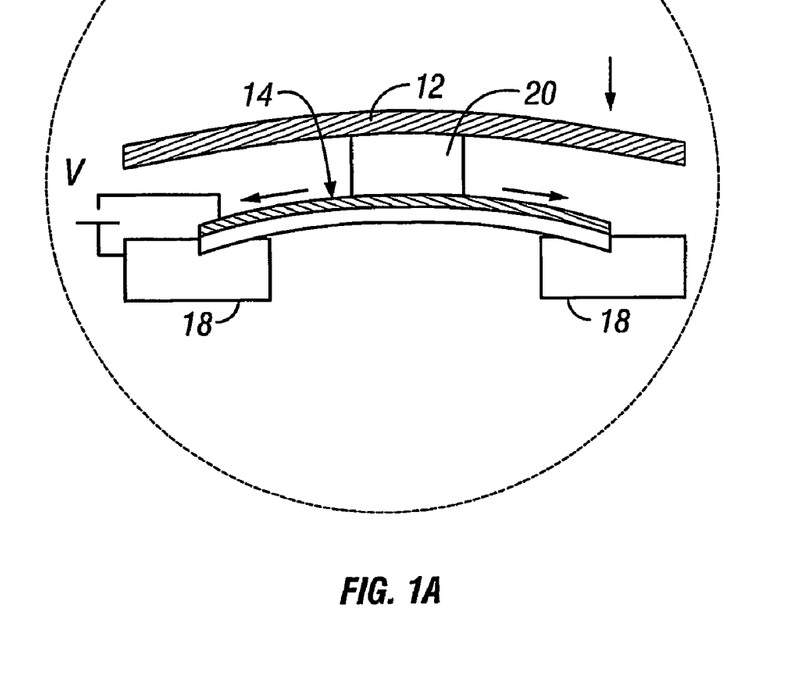
FIG. 1a an enlarged simplified side cross-sectional view of an view of one actuator in the array showing its deformation in response to applied voltages to electrodes disposed on its opposite faces.
Figure 2:
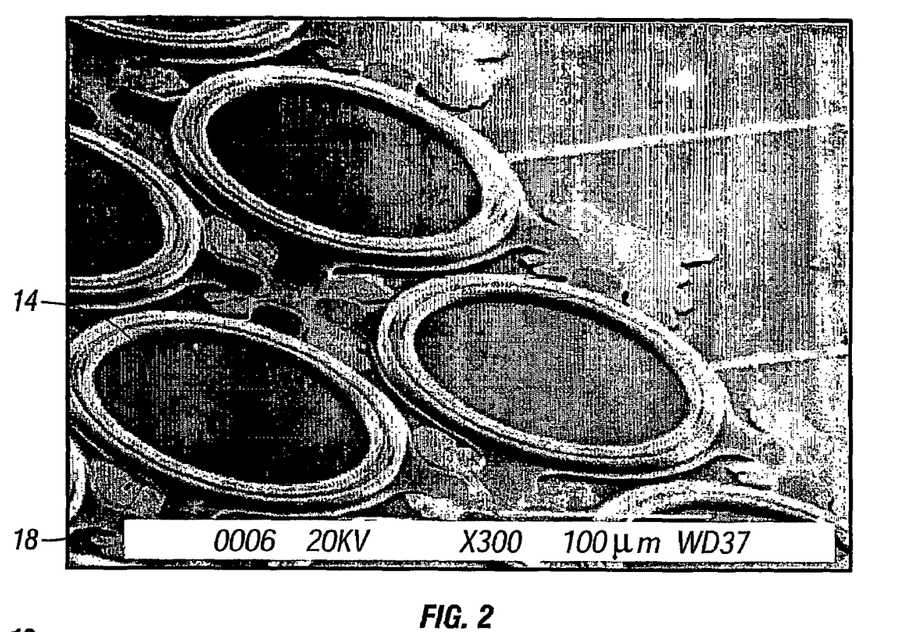

The enlargement of FIG. 1a shows a single actuator 14 coupled to a segment of mirror membrane 12. A compliant, optical quality, single face-sheet mirror membrane 12 is backed by or connected to an array of microactuators 14. Each microactuator 14 is comprised of a thick film PZT layer 16 disposed on a micromachined support 18. Mirror membrane 12 in turn is connected to layer 16 by a micromachined pedestal 20. In the illustrated embodiment as shown in FIG. 2, each microactuator 14 is fabricated with circular geometry to form part of a two dimensional array. Many other geometric forms could be substituted without substantial change.

A voltage applied to the piezoelectric layer 16 induces stress in a longitudinal direction in layer 16 causing layer 16 to deform and pull on mirror 12 connected to it through indium pedestal 20. Supports 18 are fixed to a rigid substrate or are otherwise positionally stabilized. Thus, small strains obtainable in a piezoelectric material at modest voltages are translated into large displacements. The mirror element actuation principle is based on a piezoelectric PZT-glass unimorph composite layer 16. An array cell can be approximately modeled with a one dimensional equivalent. From simple elastic and geometrical arguments, the following relations are derived.

$$\frac{\Delta}{l} = d_{31} \frac{V}{t_{PZT}} \cdot \frac{Y_{PZT} t_{PZT}}{Y_{glass} t_{glass}} \quad h = l \sqrt{2 d_{31} \frac{V Y_{PZT}}{Y_{glass} t_{glass}}}$$

where V is the applied voltage, Y's are the elastic module of the layers 16, t's are the thickness, h is the vertical deflection of the unimorph, l is the length of a unimorph, and $d_{31}$ is the relevant piezoelectric constant.

The testing of the piezoelectric properties of samples were performed by interferometric measurements on the local deflection of a 1 µm thick PZT film deposited over 620 µm thick oxidized silicon wafer. The 8 V of bias resulted in a deflection of 20 nm of the 5×5×0.62 mm$^3$ PZT capacitors.

Figure 3A:
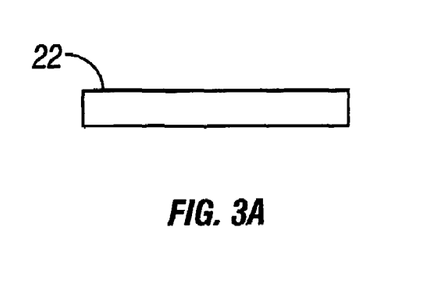
Figure 3B:
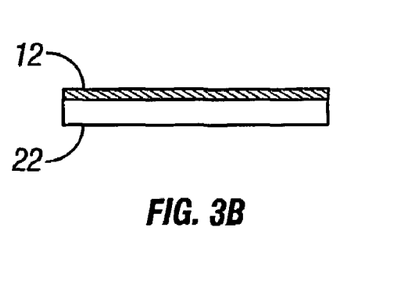
Figure 3C:
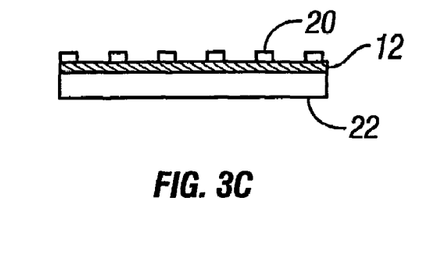
Figure 3D:
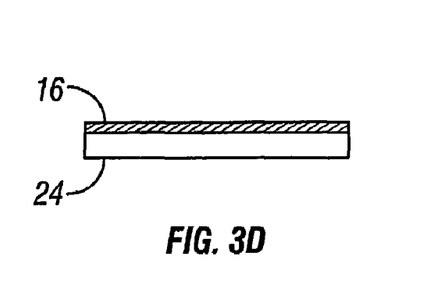
Figure 3E:
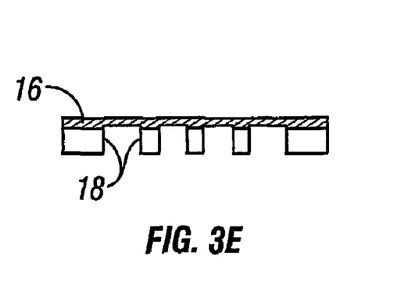
Figure 3F:
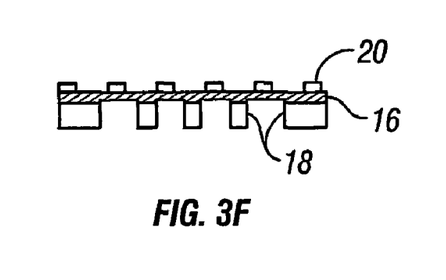
Figure 3G:
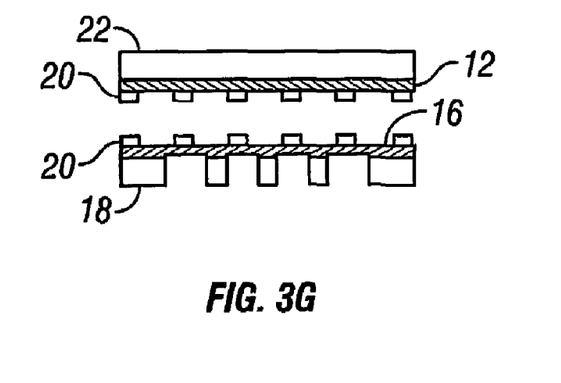
Figure 3H:
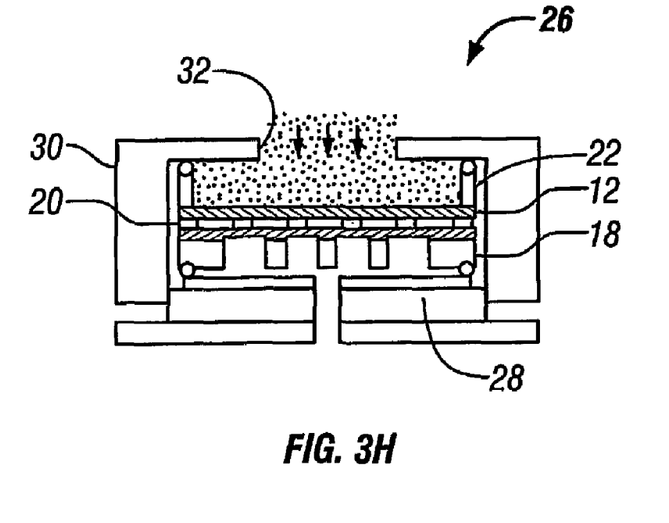
Figure 3I:
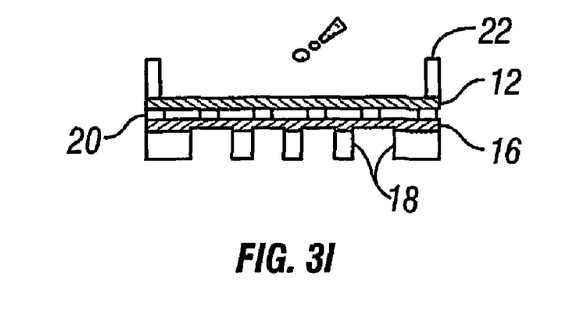
Figure 3J:
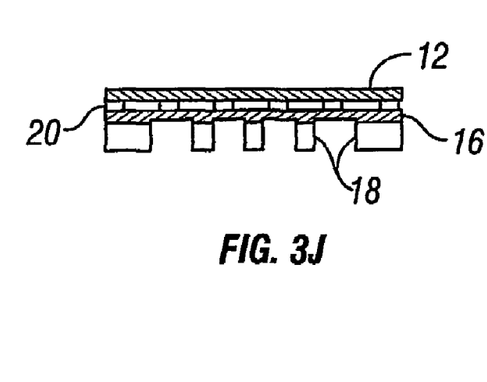

Consider the fabrication of mirror membrane 12 as diagrammatically depicted in FIGS. 3a-j. In FIG. 3a a carrier wafer 22 of silicon is optically polished. Mirror membrane 22 is deposited on wafer 22 to obtain an optical quality deformable film using a material with intrinsic tensile stress, thereby making its surface essentially a transferred replica of the optically polished surface of wafer 22. Using a shadow mask (not shown) pedestal material 20 is selectively deposited on mirror membrane 22 to result in the intermediate structure shown in FIG. 3c. A PZT thick film 16 is then deposited by MOCVD on substrate 24 as shown in FIG. 3d. Substrate 24 is selectively micromachined to define supports 18. Pedestal material 20 is then selectively deposited on layer 16 as shown in FIG. 3f. Carrier wafer 22 is inverted as shown in FIG. 3g and pedestals 20 bonded together. The bonded structure is placed in a Teflon® fixture 26 as shown in FIG. 3h, which fixture 26 is comprised of a base 28 on which a cap 30 is placed, securing the bonded structure to base 28. A chemical etchant bath of 25% by weight tetramethylammonium hydroxide acts on the bonded structure in fixture 26 until the etch stop layer of membrane mirror 12 is exposed as shown in FIG. 3h. If there is any residual polymer left on mirror membrane 12. It is removed using a dilute hydrofluoric acid as symbolically depicted in FIG. 3i. A laser cutter or a dicing saw is then used to complete the mirror transfer to result in the finished structure shown in FIG. 3j.

Figure 4:
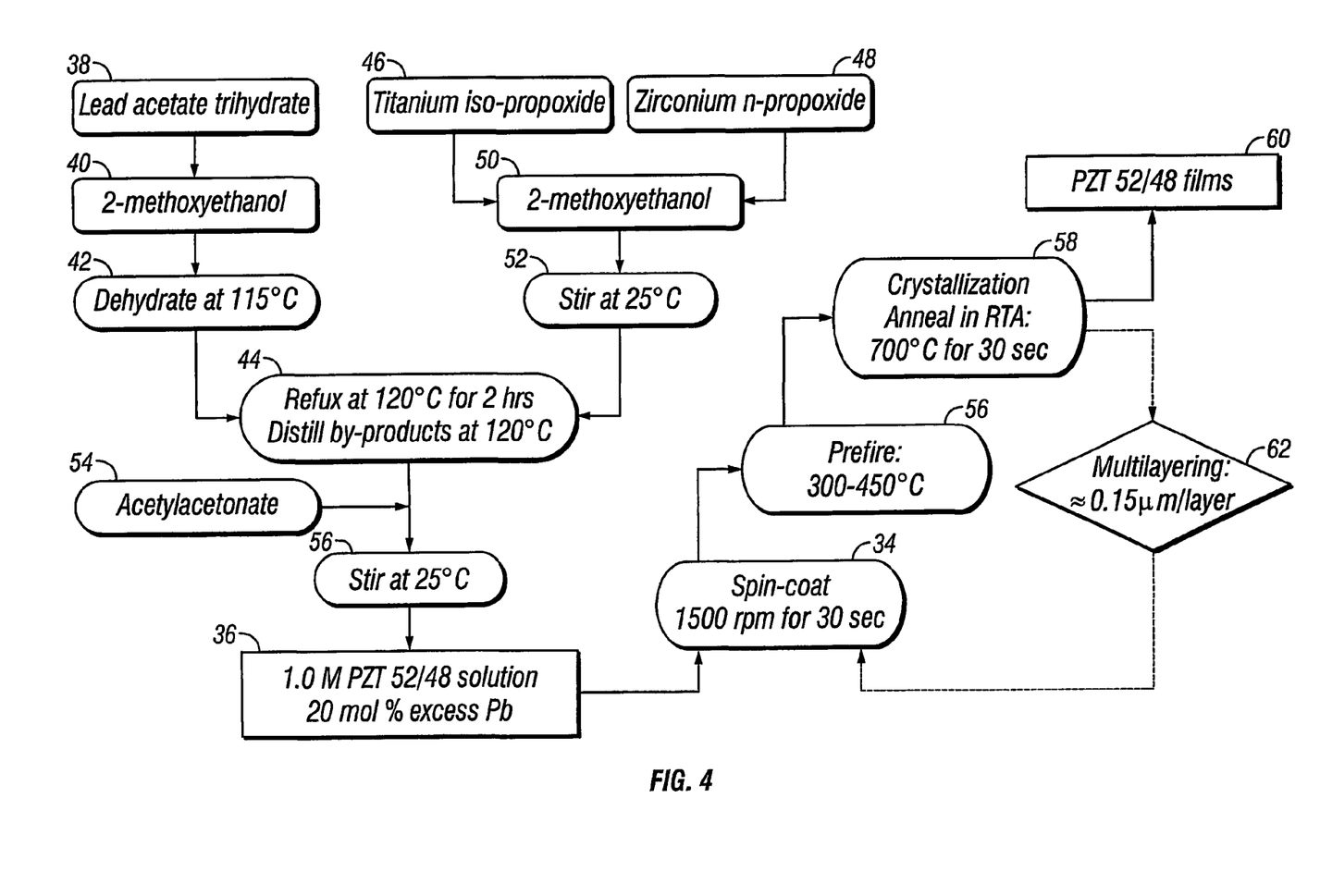
FIG. 4 is a block diagram of one method whereby the piezoelectric thick film may best be fabricated according to a process, some details of which were devised by others.
Figure 5:
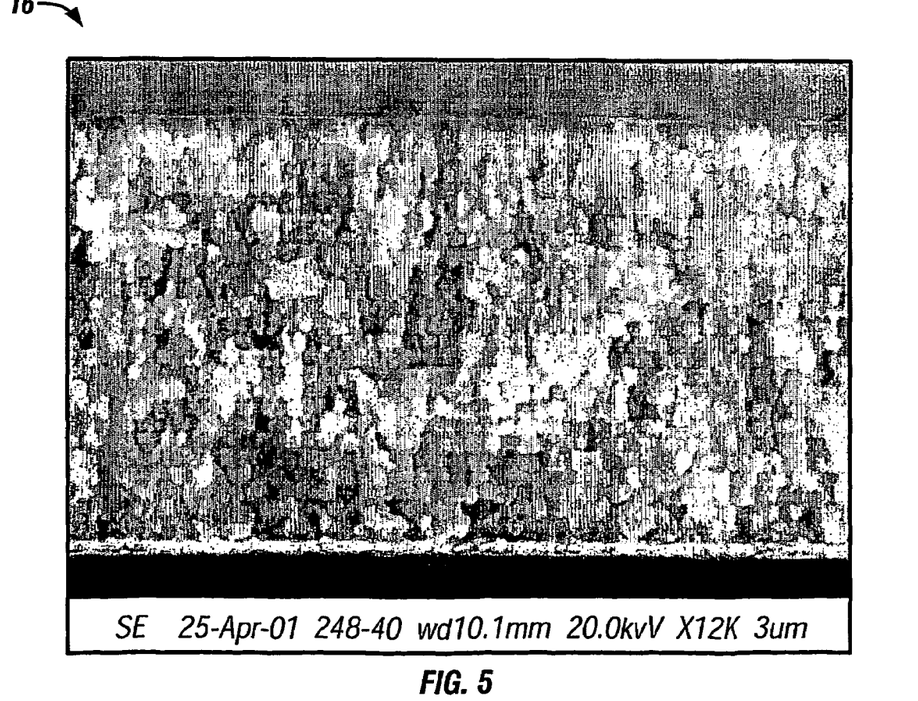
FIG. 5 is a side cross-sectional view of a microphotograph of a PZT thick film made according to the process of FIG. 4.

PZT layer 16 may be fabricated at the step illustrated in FIG. 3d by any methodology now known or later devised. The best mode currently known by the inventors has been developed by S. Trolier-McKinstry at Pennsylvania State University and is illustrated briefly in FIG. 4. The specific details of this process are shown in FIG. 4 for the purpose of a best mode disclosure, but are not per se claimed as being part of the present invention. In other words, the best mode of practicing the claimed invention is by using in one particular part a specific process, which was devised by others. However, it is also to be understood that concept of combining the specific Trolier-McKinstry steps with other steps of the claimed methodology in this technical application is not part of the Trolier-McKinstry process which was used. That combination is expressly maintained as part of the present invention. Layers or films 16 between 50 nm and ~8 μm can be deposited on 4" wafers using a sol-gel process comprised of the steps 38-56 by spin-coating at step 34 the precursor solution obtained at step 36 onto platinum coated bottom electrodes. After deposition of a single layer, the film is pyrolyzed at step 56 to remove organics and heat-treated (typically at 700° C.) at step 58 to crystallize the film. FIG. 5 shows a cross-sectional scanning electron micrograph of a 6 μm thick PZT layer 16. The resulting layers 16 at step 60 typically show dielectric constants of ~1000, loss tangents ~2-3%, remnant polarizations>20 μC/cm$^2$, and $e_{31,f}$ piezoelectric coefficients of −5.5 to −5 C/m$^2$. Edge bead removal is utilized prior to the crystallization step 58 to avoid cracking of the deposit. Multiple layering at step 62 is necessary to enable thick films to be deposited.

These films 16 have been utilized in a number of MEMS devices, including an accelerometer and a number of diaphragm and cantilever actuators. The PZT films for the accelerometer were ~6 μm thick. We envision that a diaphragm actuator would be utilized to provide the actuation force to deform the mirror membrane 12 of the deformable mirror array. On existing diaphragm structures with diameters of 500 μm, center deflections of >3 microns have been achieved using comparatively thin PZT films (~1.5 μm).

For the larger stroke actuators required here, thicker PZT films 16 would be utilized. Incorporating the thicker PZT films allows significant increase in the actuation stroke and force of the device to meet the stroke requirements of vision science (<12 μm). The thick-film PZT layers 16 will be deposited on platinum-coated silicon substrates using sol-gel processes. The films will then be patterned using a two-step wet etching approach.

The requirements of MEMS deformable mirror targeted for the vision science is summarized in Table 1.

TABLE 1

| | Requirements | PZT MEMS deformable mirror |
|---|---|---|
| Mirror membrane | High fill factor | Continuous membrane (100% fill factor) |
| Actuator spacing (μm) | — | 800 |
| Mirror diameter (mm) | 8 | 8 |
| Number of actuators | 100–200 | 100 |
| Stroke (μm) | +/−6 | 12 |
| Drive voltage (V) | — | 20 |

None of the continuous membrane deformable mirrors previously developed are capable of generating 12 μm stroke actuation, while providing an excellent optical figure with modest actuation voltages.

The potential combination of materials for micro-optics, micromechanics, and microelectronics to create a broader class of integrated micro-optical systems will affect the industrial use of the Micro Opto Electro Mechanical Systems (MOEMS) devices further and lead to the demonstration of commercial Microsystems technologies (MST) for optical communication such as integrated fiber optical switches, an optical bench on a chip, microrobotics, integrated laser optical scanners, optical shutters/choppers, and variety of integrated optical switches. Both constituent technologies in MOEMS have one critically important common feature, namely both technologies are compatible with very large scale integrated circuit (VLSI) and allow for batch processing and embossing, which make them highly attractive for commercial applications and can be produced in volume at low cost. This will result in high performance systems for microsensor and microactuator applications that are lighter, easier to produce, more efficient and less expensive than conventionally produced components. The current technologies have been driven with applications, which are silicon based, and use standard CMOS processing fabrication steps not only for the on-die CMOS memory or logic, but also for the microfabrication of the light switching devices.

In vision science, adaptive optics has made it possible to obtain images of the living human retina with unprecedented resolution, enabling researchers to see the individual receptors involved in vision. By measuring aberrations in the eye better than before, we may be able to develop better contact lenses or better laser surgery procedures. The development of new technologies is essential in wavefront correction devices. Thus, the inclusion of a high stroke MEMS deformable mirror technology has much potential for advancing the vision science.

The deformable mirror (DM) technology demonstrated by this invention has the advantages of applying MEMS technology in ultra miniaturized and high-precision components for the micro optical subsystems for various purposes, for both conventional and cryogenic applications including projection switch, stabilization and aberration mitigation.

Many alterations and modifications may be made by those having ordinary skill in the art without departing from the spirit and scope of the invention. Therefore. It must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be underwood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A microcontrollable, deformable mirror comprising:
   a mirror membrane to which a two dimensional pixel map is assigned; and
   a plurality of controllable piezoelectric microactuators forming two dimensional pixel map, each of the microactuators being coupled to the mirror membrane and separately controllable to selectively deform at least a portion of the mirror membrane corresponding to a pixel in the two dimensional pixel map.

2. The microcontrollable, deformable mirror of claim 1 further comprising a micromachined support and wherein each piezoelectric microactuator comprises a separate and isolated unimorph PZT microactuator mounted on the corresponding micromachined support which is mechanically isolated from the mirror membrane.

3. The microcontrollable, deformable mirror of claim 1 wherein the mirror is continuous and wherein each piezoelectric microactuator comprises an actuator having a maximum stroke of at least 12 μm.

4. The microcontrollable, deformable mirror of claim 3 wherein each piezoelectric microactuator comprises an actuator requiring a drive of not more than approximately 20 volts.

5. A microcontrollable, deformable mirror comprising:
   a mirror membrane; and
   a plurality of controllable piezoelectric microactuators forming an array, each of the microactuators being coupled to the mirror membrane and separately controllable to selectively deform at least a portion of the mirror membrane,
   wherein the mirror membrane provides a 100% fill factor.

6. The microcontrollable, deformable mirror of claim 5 where each piezoelectric microactuators comprises a pedestal, a planar two dimensional unimorph and a supporting substrate, the unimorph being mounted on the supporting substrate and having a unstressed plane and having electrodes defined on opposing surfaces so that in-plane stresses electrically induced in the planar two dimensional unimorph cause the unimorph to bend out of the unstressed plane in a selected direction, the pedestal being connected to the mirror membrane to couple deformation of the planar two dimensional unimorph into substantially only local deformation of the mirror membrane in the neighborhood of the connection to the pedestal relative to the supporting substrate.

7. The microcontrollable, deformable mirror of claim 1 wherein the mirror membrane is continuous and is connected at a plurality of discrete points to the plurality of separately controllable unimorph piezoelectric microactuators, where deformation of the mirror membrane is substantially independent at each of the discrete connection points.

8. A method of fabricating a microcontrollable, deformable mirror comprising the steps of:
   providing an optically polished carrier;
   deposing mirror material on the carrier to form a transfer mirror membrane;
   selectively deposing interface material on the mirror membrane;
   deposing a thick film of piezoelectric material on a substrate to form a unimorph layer;
   selectively micromaching the substrate to form a supporting substrate structure;
   selectively deposing interface material on the unimorph layer;
   bonding the unimorph layer to the mirror membrane by means of the interface material; and
   removing the carrier.

9. A method of fabricating a microcontrollable, deformable mirror comprising the steps of:
   providing an optically polished carrier;
   deposing mirror material on the carrier to form a transfer mirror membrane;
   selectively deposing interface material on the mirror membrane;
   deposing a thick film of piezoelectric material on a substrate to form a unimorph layer;
   selectively micromaching the substrate to form a supporting substrate structure;
   selectively deposing interface material on the unimorph layer;
   bonding the unimorph layer to the mirror membrane by means of the interface material; and
   removing the carrier,
   where the step of deposing a thick film of piezoelectric material on a substrate to form a unimorph layer comprises the steps of forming the unimorph layer by spin coating a precursor sol-gel solution onto the substrate, pyrolyzing the spin-coated film and annealing the film.

10. The method of claim 9 further comprising the step of multilayering the unimorph layer to form a thick film.

11. The method of claim 10 further comprising the step of removing edge beads from the unimorph layer prior to the step of multilayering.

12. A method of deforming a continuous mirror to provide a two dimensional pixellated map comprising the steps of:
   providing a continuous, flexible mirror membrane;
   connecting a plurality of controllable piezoelectric microactuators to the mirror membrane at a plurality of discrete connection points, the plurality of controllable piezoelectric microactuators being arranged and configured into an array to form the two dimensional pixellated map; and
   separately controlling each of the piezoelectric microactuators in the array pixel-by-pixel to selectively deform the continuous mirror membrane according to the two dimensional pixellated map.

13. The method of claim 12 where the mirror is continuous and wherein the step of separately controlling each of the piezoelectric microactuators in the array comprises the step of generating a displacement of each actuator up to a maximum of 12 μm or more.

14. The method of claim 13 where the step of generating a displacement of each actuator comprises the step of driving the actuator requiring with not more than approximately 20 volts.

15. The method of claim 12 where the step of separately controlling each of the piezoelectric microactuators in the array to selectively deform the continuous mirror membrane comprises the step of deforming the mirror membrane at each of the discrete connection points in a substantially independent manner.

* * * * *

UNITED STATES PATENT AND TRADEMARK OFFICE
CERTIFICATE OF CORRECTION

| | |
|---|---|
| PATENT NO. | : 7,336,412 B2 |
| APPLICATION NO. | : 10/474978 |
| DATED | : February 26, 2008 |
| INVENTOR(S) | : Eui Hyeok Yang |

It is certified that error appears in the above-identified patent and that said Letters Patent is hereby corrected as shown below:

Col. 1 Line 5 -
In the background section of the application, the Federal Support statement was omitted. Please insert the following paragraph before the Related Applications section and after the title:

--The invention described herein was made in the performance of work under a NASA contract, and is subject to the provisions of Public Law 96-517 (35 U.S.C. 202) in which the Contractor has elected to retain title.--

Signed and Sealed this

Seventeenth Day of February, 2009

JOHN DOLL
*Acting Director of the United States Patent and Trademark Office*